S. R. HANS.
CAR FENDER.
APPLICATION FILED NOV. 5, 1918.
1,320,001.
Patented Oct. 28, 1919.
2 SHEETS—SHEET 2.
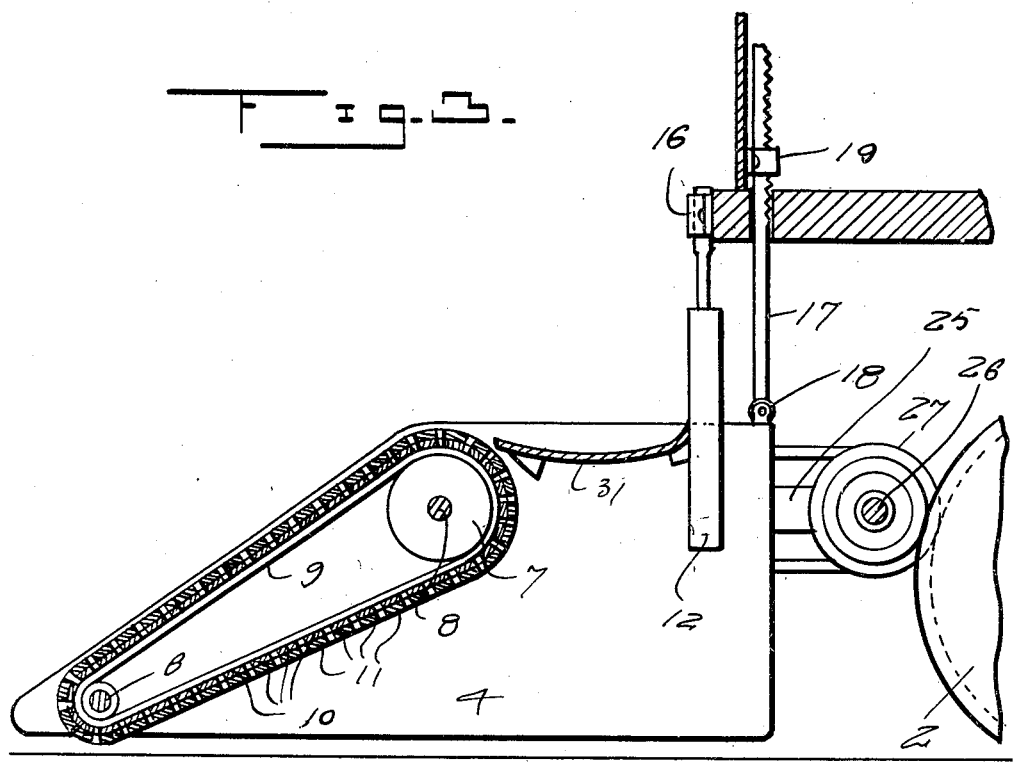
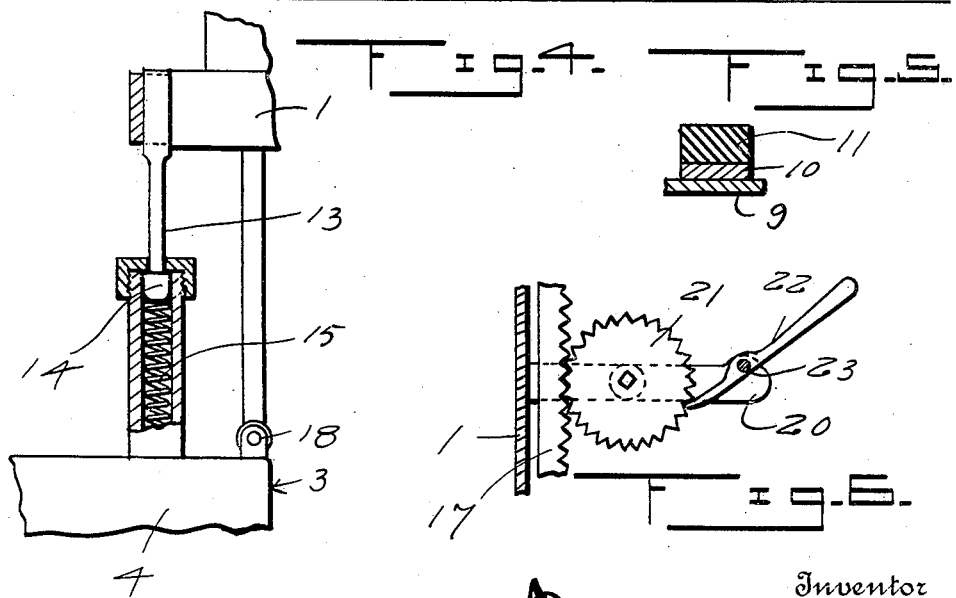
Inventor
S. R. Hans.

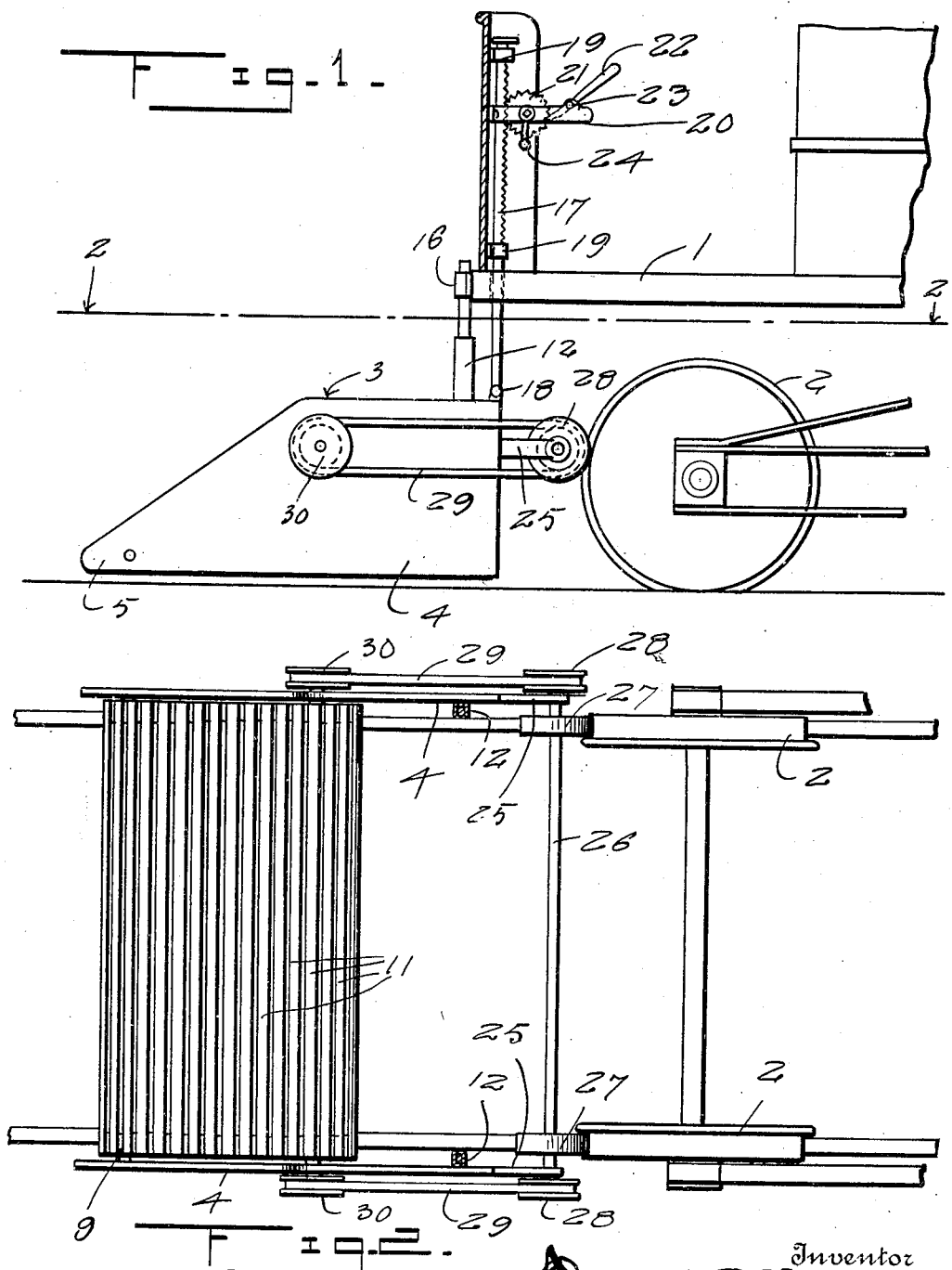

UNITED STATES PATENT OFFICE.

SAMUEL R. HANS, OF MANILA, PHILIPPINE ISLANDS.

CAR-FENDER.

1,320,001.   Specification of Letters Patent.   Patented Oct. 28, 1919.

Application filed November 5, 1918. Serial No. 261,228.

*To all whom it may concern:*

Be it known that I, SAMUEL R. HANS, a subject of the King of Great Britain, residing at Manila, Philippine Islands, have invented certain new and useful Improvements in Car-Fenders; and I do hereby declare the following to be a full, clear, and exact description of the invention, such as will enable others skilled in the art to which it appertains to make and use the same.

This invention relates to improvements in car fenders, and has for one of its objects the provision of means whereby a person can be caught and carried to a point of safety on the device without shock or injury thereto.

Another object of this invention is the provision of an endless apron adapted to be normally supported away from the ground, and which can, in case of an accident, be moved into close proximity to the ground, so that a person will be caught and conveyed to a point of safety by the endless apron.

A further object of this invention is the provision of means whereby the apron may be driven by the wheels of the car when moved into an operative position.

A further object of this invention is the provision of a car fender of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a side elevation of a car fender constructed in accordance with my invention, Fig. 2 is a top plan view of the same, taken on the line 2—2 of Fig. 1, Fig. 3 is a vertical sectional view, illustrating the apron, Fig. 4 is a detail sectional view, illustrating the means of connecting the fender to a car, Fig. 5 is a detail sectional view of one of the slats carried by the apron, Fig. 6 is a detail sectional view of a pawl and ratchet mechanism for holding the fender in an inoperative position.

Referring to the drawings, the numeral 1 indicates the front end of a car, and 2 the wheels on which the car is mounted. A fender 3 consists of side members 4, which have their front edges reduced and inclined downwardly and forwardly to form the extensions 5 to which is journaled a roller 6. A roller 7 is journaled on a shaft 8, secured to the side members 4, adjacent their upper edges, and coöperates with the roller 6 in supporting belts 9, to which are secured a plurality of slats 10. The slats 10 are constructed of any desired material, and are adapted to connect the belts 9 together to form an endless conveyer. The slats 10 are preferably covered by rubber strips 11.

Casings 12 are secured to the side members 4 adjacent their rear ends and slidably receive rods 13, provided with heads 14, which rest upon springs 15 located in the casings. The upper ends of the rods 13 are secured to the car 1 by brackets 16. A rack bar 17 is pivoted to the fender 3, as illustrated at 18, and extends upwardly through an opening in the car 1, and is slidably received by brackets 19. A bracket 20 is secured to the car and located adjacent the rack bar 17, and has journaled thereon a ratchet wheel 21, which meshes with the teeth of the rack bar and is held against rotation by means of a gravity actuated dog 22. The dog 22 is pivoted to the bracket, as illustrated at 23. The normal position of the fender 3 is approximately eight inches from the ground or tracks, and is supported in this position by means of the ratchet wheels 21 and the gravity actuated dog 22. The shaft on which the ratchet wheel 21 is secured is provided with a squared portion to receive an ordinary crank 24 for elevating the fender when desired. An arm 25 is secured to the rear end of the fender 3, and has secured thereto a shaft 26 on which is journaled a friction wheel 27, adapted to engage the periphery of the car wheel 2 when the fender is in its lowest position, and which will be clear of the car wheel when the fender is elevated. A pulley 28 is formed upon the friction wheel 27, and has mounted thereon an endless belt 29.

The endless belt 29 passes over a pulley 30 secured to the shaft 8, whereby when the fender 3 is moved into an operative position the endless apron will be driven by the car wheel 2. The friction wheel 27 is preferably covered with rubber or similar material to permit the same to readily obtain traction upon the periphery of the car wheel.

The side members 4 of the fender 3 have secured thereto, adjacent their upper ends, an arcuate shaped supporting member 31, the forward edge of which is disposed adjacent the end of the upper run of the endless apron, so that objects or persons conveyed upwardly by the apron will be deposited upon the support 31, and carried by the same until the car is brought to a stop.

In operation, in case of an accident, the operator of the car releases the gravity actuated dog, permitting the fender 3 to fall in close proximity to the ground. On the fender moving into this position, the friction wheel 27 engages the car wheel 2, setting the endless apron in rotation. Upon an object engaging the apron, it is caught by the upper run of the same and carried upwardly and deposited upon the support or carrier 31.

While I have shown and described the preferred embodiment of my invention, it will be understood that minor changes in construction, combination and arrangement of parts may be made without departing from the spirit and scope of the invention as claimed.

Having thus described my invention, what I claim is:

1. The combination with a car including a wheel, a frame, a rack bar connected to the frame and extending through the car, brackets carried by the car and receiving the rack bar, and a bracket carried by the car, a ratchet wheel journaled to the last-named bracket, means holding said ratchet wheel against accidental movement for supporting the frame in an elevated position, an endless apron carried by the frame, a support carried by the frame, a casing secured to the frame, a spring located in said casing, rods secured to the car and engaged in the casing and bearing against the spring for normally urging the frame downwardly, and means carried by the frame and adapted to engage the car wheel for driving the endless apron when the frame is in its lowermost position.

2. A car fender comprising a frame, means adjustably connecting said frame to a car, an endless apron carried by said frame, a support carried by said frame and adapted to receive objects from the apron, means driving the apron from the wheel of the car, means urging the frame downwardly from the car, and means holding the frame elevated against action of the last named means.

In testimony whereof I affix my signature, in presence of two witnesses.

SAMUEL R. HANS.

Witnesses:
 FRANK MATTSON,
 THOMAS H. WILLIAMS.

Copies of this patent may be obtained for five cents each, by addressing the "Commissioner of Patents, Washington, D. C."